D. W. Barker,
Ash Sieve.

No. 69,748. Patented Oct. 15, 1867.

Witnesses:

Inventor:

United States Patent Office.

DAVID W. BARKER, OF NEW HAVEN, CONNECTICUT.

*Letters Patent No. 69,748, dated October 15, 1867.*

IMPROVEMENT IN ASH-SIFTERS.

*The Schedule referred to in these Letters Patent and making part of the same.*

TO ALL WHOM IT MAY CONCERN:

Be it known that I, DAVID W. BARKER, of New Haven, in the county of New Haven, and State of Connecticut, have invented a new Improvement in Ash-Sifter; and I do hereby declare the following, when taken in connection with the accompanying drawings, and the letters of reference marked thereon, to be a full, clear, and exact description of the same, and which said drawings constitute part of this specification, and represent, in—

Figure 1:
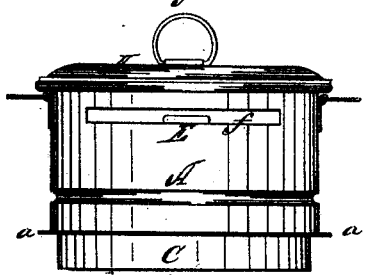
Figure 2:
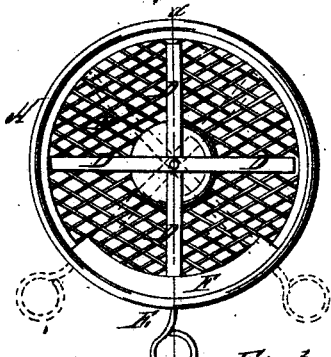

Figure 1, a side view,

Figure 2 a top view with the cover removed, and in

Figure 3:
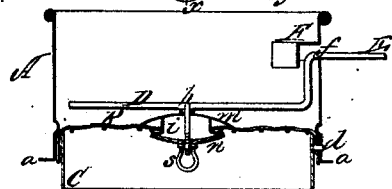

Figure 3 a section on line $x\ x$ of fig. 2.

This invention is designed for sifting the ashes which come from coal fires, or like purposes, and consists in the peculiar construction of the sieve, and in the arrangement for agitating the ashes in order to cause them to pass through the sieve.

To enable others to construct and use my improvement, I will proceed to describe the same as illustrated in the accompanying drawings.

A is a case, formed from metal or other suitable material, having a flange, $a$, turned outward upon its lower edge, which forms a support for the sifter to rest upon. B is the wire netting or sieve, which is cut to the proper size, and stretched over a cylinder, C, as seen in fig. 3, and forced up into the case A, and in that position secured by rivets $d$, or otherwise, the cylinder C extending below the flange $a$, so as to enter the barrel or box upon which the sifter rests. Centrally through the sieve B is pivoted the beater D, which may be any desirable number, here shown as four. From the said beaters a handle, E, extends up and through the case, as seen in fig. 3, a slot, $f$, (as seen in fig. 1,) being formed so that the handle and beaters may be moved to the right and left, as denoted in blue and red, fig. 2. The slot $f$ is protected by a cover, F, extending in and downward, so as to prevent the ashes from escaping through the said slot. The bearing for the pivot $h$ is formed by a sleeve, $i$, inserted through the sieve, and a plate, $m$, above, and $n$ below, and a nut, $s$, upon the lower end of the pivot, which secures the parts together, and forms a strong and secure bearing for the beaters. The case is closed by a cover, H, as seen in fig. 1.

The use of the sifter is as follows: Set it on to an open barrel or other suitable receptacle, so that the cylinder C will enter and the flange $a$ rest upon the said receptacle to support the sifter; then remove the cover, pour the ashes on to the sieve or netting B, replace the cover, then move the handle E from right to left, as denoted in blue, fig. 2, stirring the ashes and cinders until they have become separated, and the ashes passed down through into the receptacle; then remove the cover; the clinkers seen may be picked out; then by other movements of the beaters the cinders so disturbed as to bring other clinkers to the top, and so on until all are removed, and this in the most convenient and simple manner.

Having thus fully described my invention, what I claim as new and useful, and desire to secure by Letters Patent, is—

1. In combination with the case A, and sieve or netting B, I claim the beaters D, operating substantially in the manner herein set forth.

2. In combination with the beaters D, the handle E, and case A, I claim the protecting flange $a$.

3. The combination of the plates $m$ and $n$ and sleeve $i$ with the beaters D and netting B, when constructed so as to form the bearing for the beaters, substantially in the manner herein set forth.

DAVID W. BARKER.

Witnesses:
JOHN H. SHUMWAY,
A. J. TIBBITS.